United States Patent
Brown et al.

(10) Patent No.: US 6,805,399 B1
(45) Date of Patent: Oct. 19, 2004

(54) VEHICLE MOMENTUM FORCE ACTUATED BRAKING AEROSTABILIZER

(76) Inventors: Allan L. Brown, 12864 Biscayne Blvd., #318, North Miami, FL (US) 33181-2007; Donald E. Burg, 15840 SW. 84th Ave., Miami, FL (US) 33157

(*) Notice: Subject to any disclaimer, the term of this patent is extended or adjusted under 35 U.S.C. 154(b) by 0 days.

(21) Appl. No.: 10/672,827

(22) Filed: Sep. 26, 2003

(51) Int. Cl.[7] .............................................. B62D 37/02
(52) U.S. Cl. ................................... 296/180.5; 296/180.1
(58) Field of Search .......................... 296/180.1, 180.5; 180/903; 188/270, 2 R

(56) References Cited

U.S. PATENT DOCUMENTS

| | | | | |
|---|---|---|---|---|
| 6,139,090 A | * | 10/2000 | Stidd | 296/180.5 |
| 6,520,564 B1 | * | 2/2003 | Liang | 296/180.5 |
| 6,540,282 B2 | * | 4/2003 | Pettey | 296/180.5 |
| 6,655,727 B2 | * | 12/2003 | Hill et al. | 296/180.5 |
| 6,672,651 B1 | * | 1/2004 | Shuen | 296/180.5 |
| 6,712,424 B2 | * | 3/2004 | Swain | 296/180.1 |

FOREIGN PATENT DOCUMENTS

| | | | | |
|---|---|---|---|---|
| JP | 402006281 A | * | 1/1990 | 296/180.5 |
| JP | 402120195 A | * | 5/1990 | 296/180.5 |
| JP | 402241883 A | * | 9/1990 | 296/180.5 |

* cited by examiner

*Primary Examiner*—D. Glenn Dayoan
*Assistant Examiner*—Greg Blankenship
(74) *Attorney, Agent, or Firm*—Robert J. Van Der Wall

(57) ABSTRACT

Presented is a vehicle aerostabilizer(s) that is at least partially actuated by momentum forces generated on a weight when the vehicle is decelerating as when the brakes are applied. Movement of the weight translates forces to the vehicle aerostabilizer that cause the aerostabilizer to rotate to a more vertical position thereby adding aerodynamic drag forces to help slow the vehicle. Several options to doing this are offered including two or more aerostabilizers that may or may not rotate in concert. Much is dependent upon having an aerodynamically and weight balanced aerostabilizer(s) and limits on such balance are described. Damping systems to provide smooth operation and movement of the weight(s) and the aerostabilizers are also offered.

53 Claims, 5 Drawing Sheets

VEHICLE MOMENTUM FORCE ACTUATED BRAKING AEROSTABILIZER

BACKGROUND TO THE INVENTION

The use of aerostabilizers, more commonly called spoilers, wings, or tails, as stabilizers for vehicles has been around for many years. The idea of the aerostabilizer is to apply a downward force, generally to the rear of the vehicle, to improve stability and control. This appears to have originated from units originally applied to racing cars.

Aerostabilizers are now popular on cars and trucks, even boats in rare instances, used for everyday use. Some of the race car designs have adjustable aerostabilizers that can be adjusted from the driver's position while underway. This makes for more precise control and stability at all speeds. Some race cars have aerostabilizers that are not only adjustable but also tilt upward to a very high angle when the brakes are applied. The idea was to increase aerodynamic drag of the aerostabilizer and thereby help in braking of the vehicle. The power to run such braking units is in the form of hydraulic or pneumatic actuators due to the large forces required when the brakes are applied at high speeds.

The use of such force actuators is rather complicated and expensive. While such complication and expense can be tolerated in high cost race vehicles, it is generally prohibitive for vehicles used for everyday driving.

The instant invention presents a very low cost and simple air braking aerostabilizer. This is accomplished by use of the momentum forces that occur when the vehicle is slowed down. It is a feature of this invention that the aerostabilizer(s) be balanced about a pivot so that the forces to operate the aerostabilizer are minimized. This will be understood upon review of the following sections.

SUMMARY OF THE INVENTION

A primary object of the invention is to provide an improved first aerostabilizer for vehicles that is capable of changing to a more vertical position when the vehicle is decelerated to thereby add an aerodynamic braking force that aids in stopping the vehicle.

A directly related object of the invention is that a weight, a more descriptive term for this weight might be a momentum force generating weight, is in communication with the first aerostabilizer wherein said weight is free to move at a different rate than the first aerostabilizer when the vehicle is decelerated. A more descriptive term for this weight might be a momentum force generating weight. In any case, such movement of said weight, by means of its communication with the first aerostabilizer, places a biasing force on said first aerostabilizer thereby allowing said first aerostabilizer to rotate about a pivot resulting in a raising of one end of the first aerostabilizer higher than another end of said first aerostabilizer.

It is a related object of the invention that the term pivot may apply to a pivot that changes location by design when the aerostabilizer is changing its orientation.

Another important object of the invention is that the pivot be disposed proximal an average fore to aft mid-point of the first aerostabilizer.

An optional object of the invention is that it may include a second aerostabilizer in communication with the first aerostabilizer and wherein said second aerostabilizer moves with the first aerostabilizer.

It is a directly related object of the invention that movement of the second aerostabilizer may be in concert with the first aerostabilizer or may not be in concert as may be accomplished by using connecting levers, gears, or the like between the first and the second aerostabilizers.

A directly related object of the invention is that the pivot can be disposed within fifteen percent of a midpoint of an average fore to aft length of the first aerostabilizer.

A further related object of the invention is that the pivot can be disposed within twenty-five percent of a midpoint of an average fore to aft length of the first aerostabilizer.

Yet another related object of the invention is that the pivot be disposed within thirty-five percent of a midpoint of an average fore to aft length of the first aerostabilizer.

Another optional object of the invention is that it may further include a second aerostabilizer that is, at least partially, independent of movement of the first aerostabilizer.

A directly related object of the invention is that the pivot be disposed within fifteen percent of a midpoint of an algebraic sum of fore to aft lengths and spacings of the first and second aerostabilizers.

A further related object of the invention is that the pivot be disposed within twenty-five percent of a midpoint of an algebraic sum of fore to aft lengths and spacings of the first and second aerostabilizers.

Yet a further object of the invention is that the pivot be disposed within thirty-five percent of a midpoint of an algebraic sum of the fore to aft lengths and spacings of the first and second aerostabilizers.

Another object of the invention is that it may further comprise one or more additional aerostabilizers in communication with the first aerostabilizer and that move when the first aerostabilizer moves.

A related object of the invention is that the pivot be disposed within fifteen percent of a midpoint of an algebraic sum of the fore to aft lengths and spacings of the aerostabilizers.

Another related object of the invention is that the pivot be disposed within twenty-five percent of a midpoint of an algebraic sum of the fore to aft lengths and spacings of the aerostabilizers.

Yet another object of the invention is that pivot be disposed within thirty-five percent of a midpoint of an algebraic sum of the fore to aft lengths and spacings of the aerostabilizers.

Another optional object of the invention is that it may further include a second aerostabilizer that is, at least partially, independent of movement of the first aerostabilizer.

Yet another object of the invention is that communication means of the weight with the first aerostabilizer includes a first connecting lever.

Yet another object of the invention is that communication means of said weight with the first aerostabilizer includes a second connecting lever.

Still another object of the invention is that communication means of said weight with the first aerostabilizer includes a first gear.

A related object of the invention is that communication means of said weight with the first aerostabilizer includes a second gear.

Yet still another object of the invention is that said weight be disposed, at least partially, internal to a stanchion and wherein said stanchion is disposed between the first aerostabilizer and an attachment means on the vehicle.

Still another object of the invention is that there be two stanchions disposed between the first aerostabilizer and the vehicle and that there be connecting means between the two stanchions, other than an aerostabilizer, that is disposed, at least in its majority, above stanchion attachment means on the vehicle.

A related object of the invention is that the connecting means between the two stanchions support a brake light.

It is considered workable for the pivot to be disposed within forty-five percent of the midpoint location. A range of preferred locations, as specified herein, for the location of the midpoint are: 15 percent of midpoint location, 30 percent of midpoint location, and 45 percent of midpoint location.

For example, if A+B=10 inches, then midpoint would be with A=5 inches and B=5 inches. Considering the 45 percent example biased in favor of A: A would be 5+(45%×5)=5+ 2.25=7.25 inches and B would be 5−(45%×5)=2.75 inches. If biased in favor of B: A=2.75 inches and B=7.25 inches. These values that locate the preferred pivot location are dependent on shape of the aerostabilizer(s), air flow characteristics to and around the aerostabilizer, and other factors. A main item of importance is to keep the aerostabilizer(s) as aerodynamically and weight balanced as possible so that the forces required to actuate it are reduced as much as possible.

Figure 12:
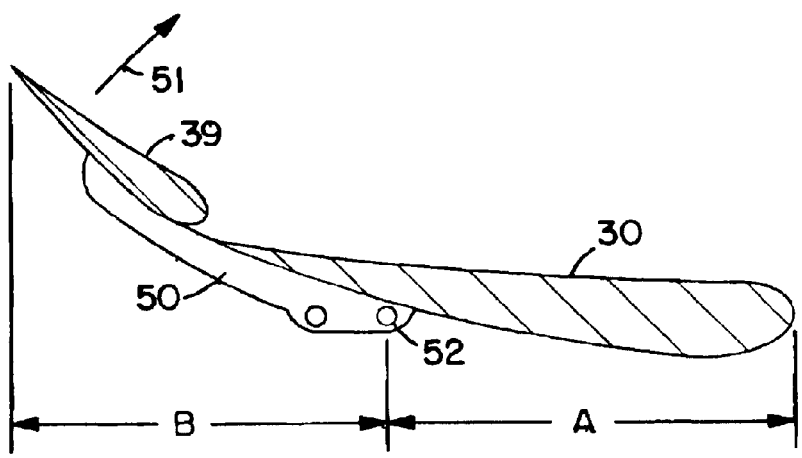

FIG. 12 presents an alternative cross section showing a first and a second aerostabilizer that are connected by a bracket. In this case, the A+B measurements include the algebraic sum of A+B which includes spacings between them.

Figure 13:
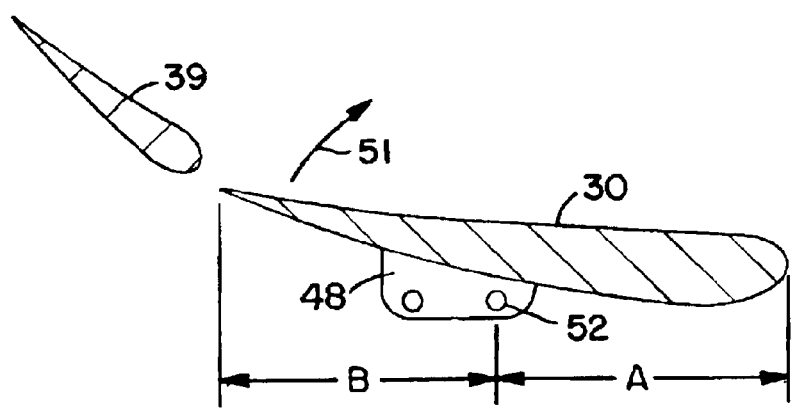

FIG. 13 gives yet another example of how a first and a second aerostabilizer might work. In this example the second aerostabilizer is fixed in position and only the moveable forward aerostabilizer is defined by the A and B measurements. Variations in the just given examples, FIGS. 11 through 13, can be made. These variations may include multiple aerostabilizers that may or may not be connected or move in unison.

DETAILED DESCRIPTION

Figure 1:
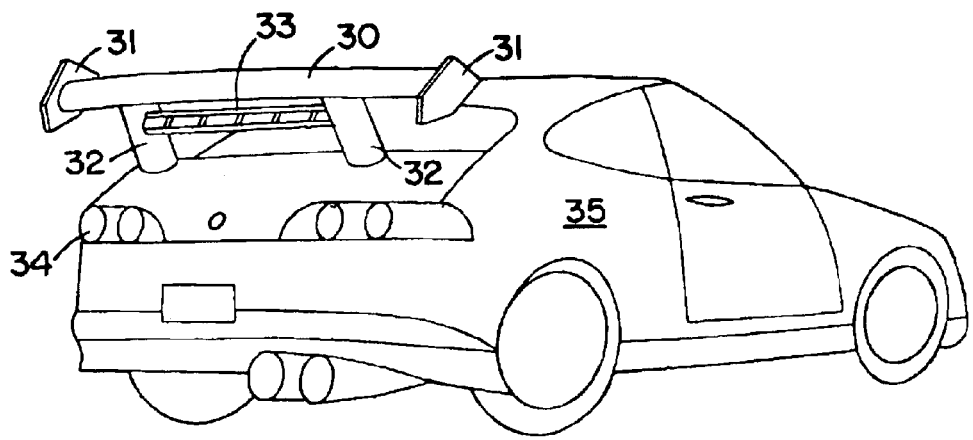
FIG. 1 presents an isometric view showing a rear quarter of a vehicle, in this case an automobile, with the instant invention aerostabilizer. In this instance the car is traveling forward and the aerostabilizer is in its normal more horizontal orientation.

FIG. 1 presents a quarter rear isometric view of a vehicle 35 with a vehicle stoplight 33 that has a first aerostabilizer 30 installed aft. The first aerostabilizer 30 includes end plates 31, mount stanchions 32, stoplight 33.

Figure 2:
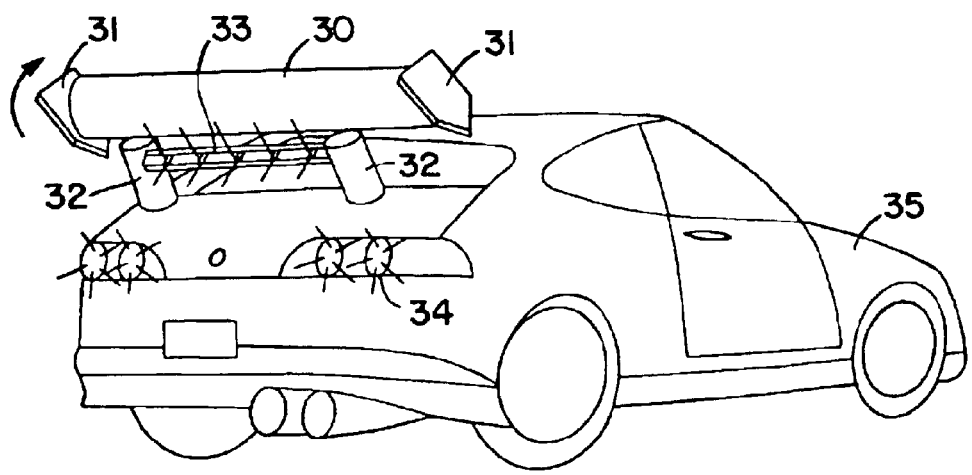
FIG. 2 presents the same isometric view of a vehicle as that given in FIG. 1 except in this case the vehicle is decelerating. Note that the aerostabilizer has tilted to a more vertical orientation to thereby add a braking aerodynamic drag force to the vehicle.

FIG. 2 is the same view of a vehicle 35 as given in FIG. 1 but in this case the vehicle 35 is decelerating and the first aerostabilizer 30 has rotated upward to thereby add an aerodynamic drag force to help slow down the vehicle 35. Note that the brake lights 33, 34 have been energized here as the brakes have been applied.

Figure 3:
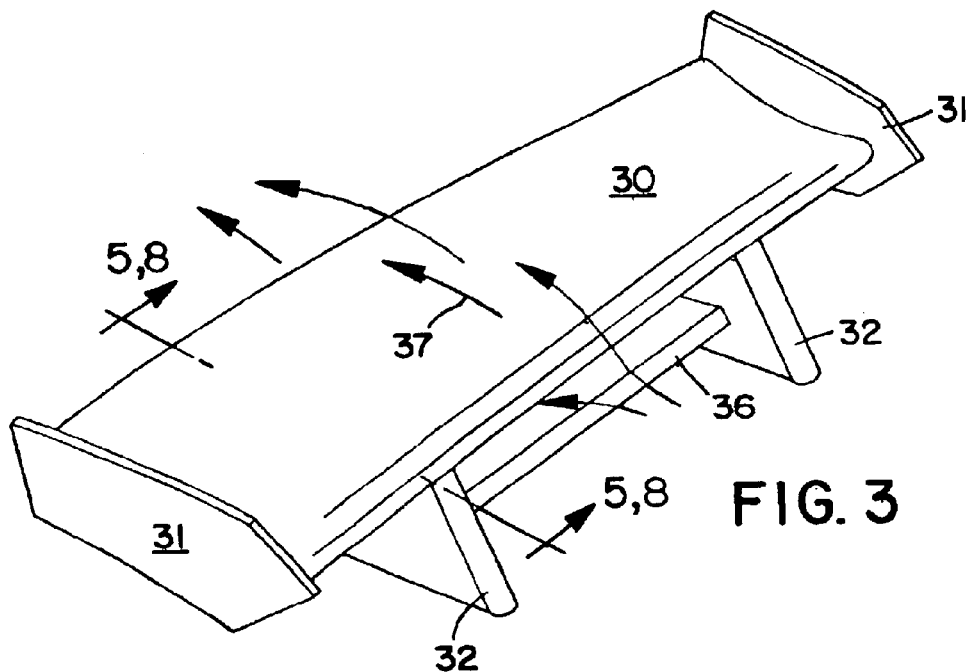
FIG. 3 is a forward quarter isometric view of the aerostabilizer only from FIG. 1. Note the low drag smooth relatively undisturbed air flow arrows over the top of the aerostabilizer.

FIG. 3 is a front quarter view of the first aerostabilizer 30 of FIG. 1. Note the air flow arrows 37 that indicate the smooth low drag of the air over the first aerostabilizer in this forward non-decelerating mode of the vehicle. A connecting structure 36 braces the two stanchions 32 is also shown.

Figure 4:
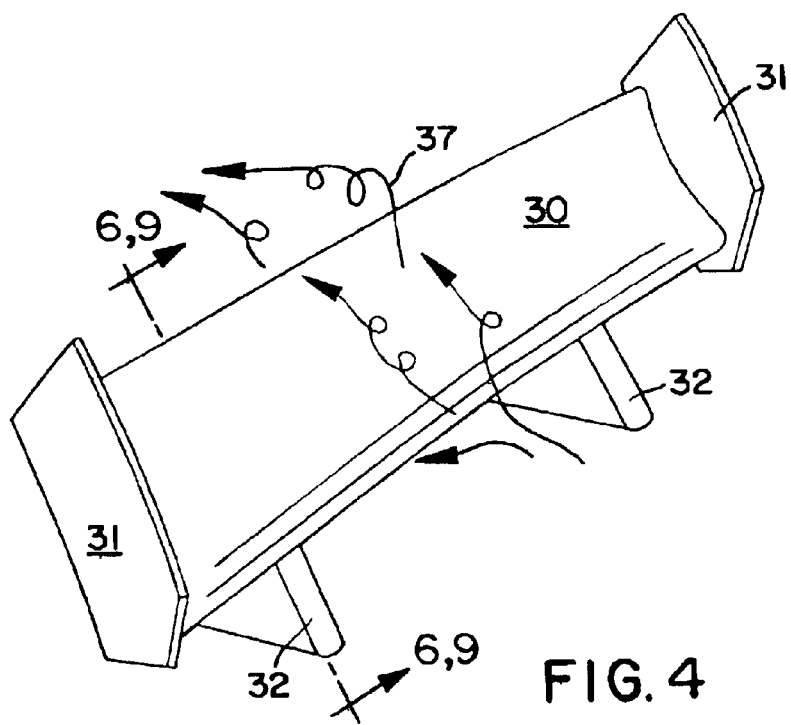
FIG. 4 is a forward quarter isometric view of the aerostabilizer only from FIG. 2 that shows the aerostabilizer in its tilted up or braking orientation. Note the high aerodynamic drag of the aerostabilizer that is indicated by the disturbed air flow arrows over the top of the aerostabilizer that occurs when the air flow more directly impacts the aerostabilizer.

FIG. 4 presents a front quarter view of the first aerostabilizer 30 of FIG. 2 where the vehicle 35 is decelerating because its brakes have been applied. Note the disturbed air flow over the top of the first aerostabilizer which adds to vehicle 35 drag when the vehicle 35 is decelerating.

Figure 5:
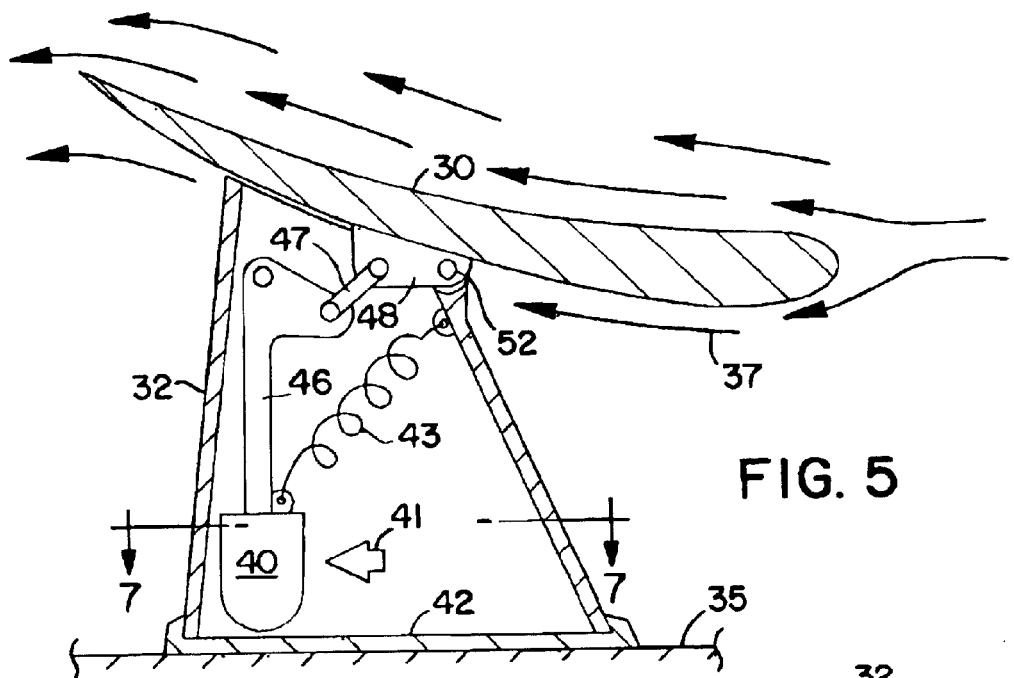
FIG. 5 presents a cross-sectional view, as taken through line 5—5 of FIG. 3 that shows a preferred embodiment of the workings of the weight. In this instance the weight is aft since the vehicle is moving forward at constant or accelerating speed and the aerostabilizer is in its lower and more horizontal orientation.

FIG. 5 presents a cross-sectional view, as taken through line 5—5 of FIG. 3, that shows the first aerostabilizer 30 in its down and low drag orientation as occurs when the vehicle 35 is traveling forward and not decelerating. Items shown include air flow arrows 37, pivot 52, weight 40, connecting levers or arms 46, 47, bracket 48, stanchion 32, resilient biasing element 43 which in this case is a spring, gasket or other attachment means 42, and vehicle attachment surface 35. A force arrow 41 is shown for illustration purposes.

Figure 6:
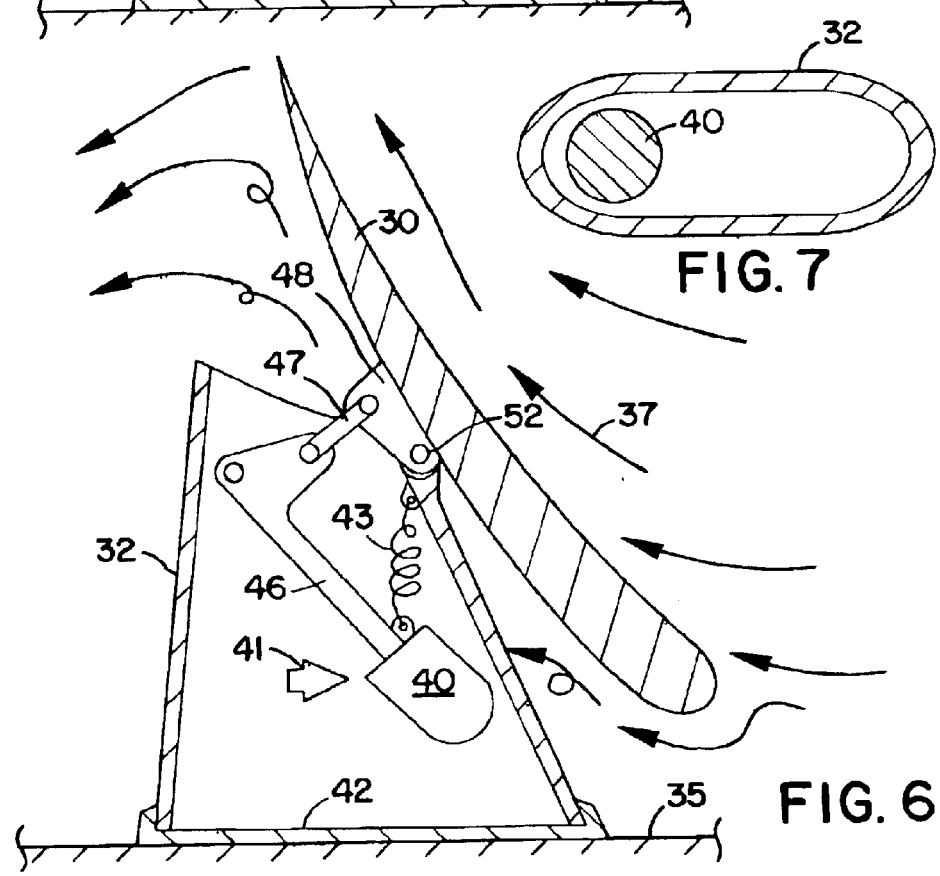
FIG. 6 is a cross-sectional view, as taken through line 6—6 of FIG. 4, that shows the weight has moved forward due to deceleration generated momentum forces. The momentum force on the weight results in a force being transmitted to the aerostabilizer that causes its forward portion to tilt downward. It is very important to note the location of the pivot about which the aerostabilizer rotates. This pivot location must be proximal a fore to rear center of the aerostabilizer to minimize the forces required to move the aerostabilizer. A resilient bias or damping effect is provided by resilient damping means such as the spring shown.

FIG. 6 gives a cross-sectional view, as taken through line 6—6 of FIG. 4 that shows the effect of decelerating the vehicle 35. Note that the weight 40 has swung forward thereby rotating lever 46 and applying a force through connecting lever 47 to the bracket 48. This preferred embodiment of the invention then applies a force to the first aerostabilizer 30 to thereby cause it to rotate about pivot 52 to this more vertical and aerodynamic braking position. Note that the force arrow 41 is opposite that given in FIG. 5.

Figure 7:
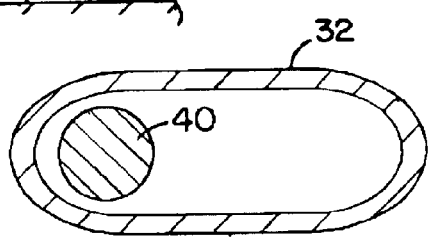
FIG. 7 present a cross-section, as taken through line 7—7 of FIG. 5, that shows the stanchion and how the weight is, in this preferred embodiment of the invention, contained inside of said stanchion.

FIG. 7 is a cross-section, as taken through line 7—7 of FIG. 5, that shows a typical way that the weight 40 can be disposed inside of a stanchion 32.

Figure 8:
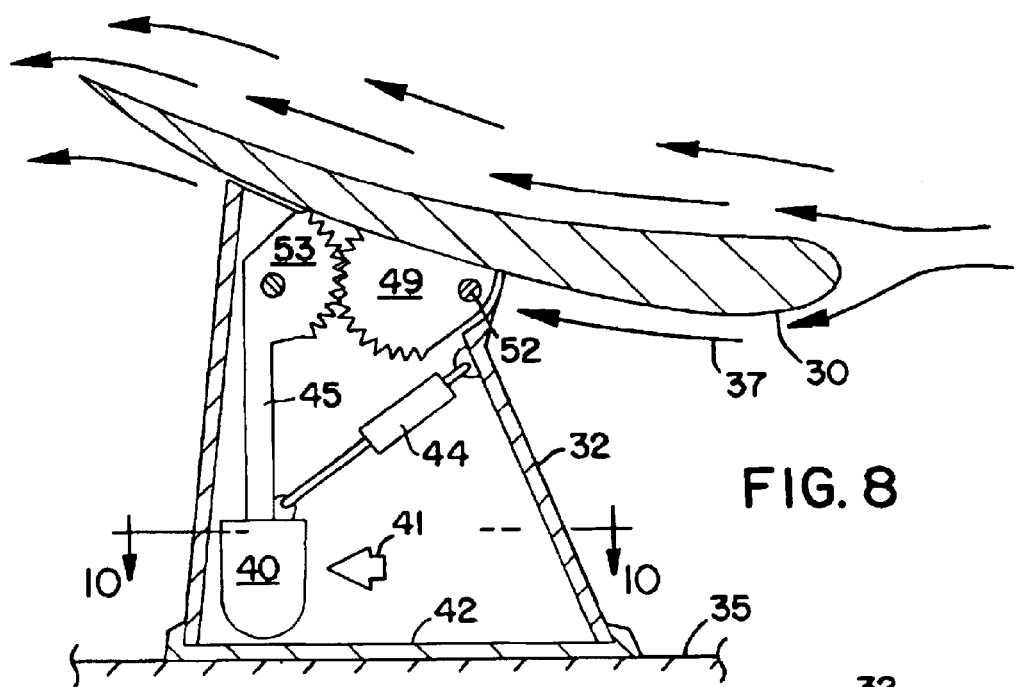
FIG. 8 is a cross-sectional view, as taken through line 8—8 of FIG. 3, that shows a similar system to that presented in FIG. 5 but with different mechanicals. In this case mechanical communication is accomplished through gears and the damping of the weights movement is accomplished by a dashpot.

FIG. 8 shows a cross-sectional view, as taken through line 8—8 of FIG. 3, that shows and alternate mechanical arrangement to that presented in FIG. 5. In this case, standard gears 49, 53 are utilized. Also, a dashpot 44 has been substituted for the spring shown in FIG. 5.

Figure 9:
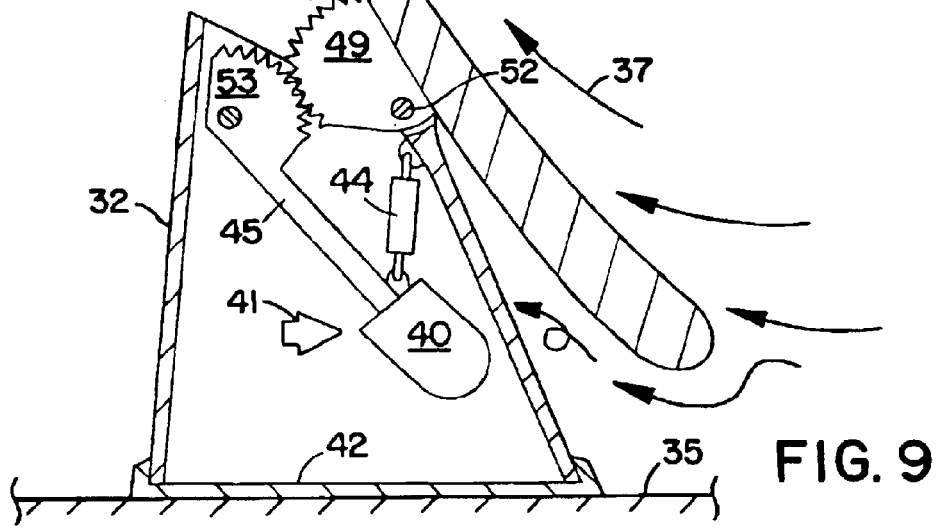
FIG. 9 presents a cross-sectional view, as taken through line 9—9 of FIG. 4, that shows position of the weight, dashpot, and aerostabilizer when the vehicle is decelerating.

FIG. 9 presents a cross-sectional view, as taken through line 9—9 of FIG. 4, that shows and alternate mechanical arrangement to that presented in FIG. 6. Refer to the immediately preceding discussion for the new elements.

Figure 10:
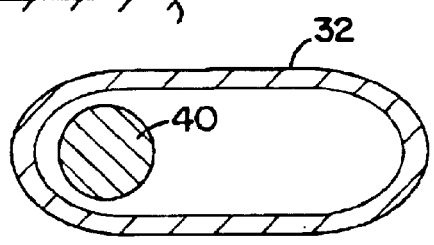
FIG. 10 presents a cross-section, as taken through line 10—10 of FIG. 8. This shows the weight as disposed, at least in this preferred embodiment of the invention, internal to a stanchion.

FIG. 10 present a cross-section, as taken through line 10—10 of FIG. 8. This is the same as the cross section presented earlier in FIG. 7.

Figure 11:
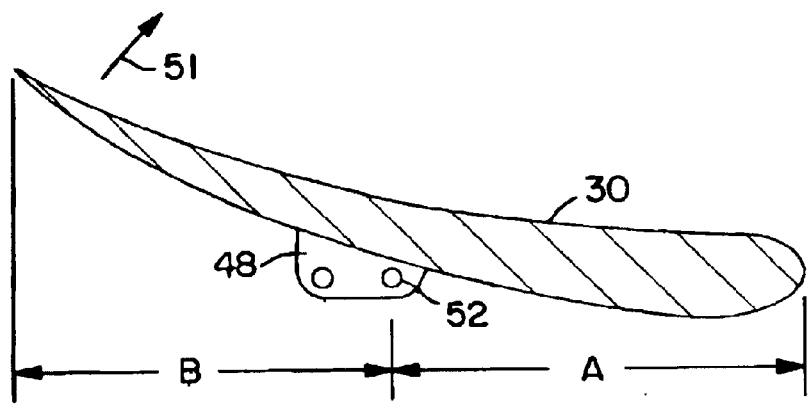
FIG. 11 shows a cross section of a first aerostabilizer showing an attachment bracket that includes a preferred location of a pivot. The A and B dimensions are equal here as they would be in the preferred embodiment of the instant invention.

FIG. 11 presents a first aerostabilizer 30 and indicates where a preferred location for the pivot 52 would be disposed by use of the letters A and B. Refer to a more detailed discussion of these elements under the preceding section titled BRIEF DESCRIPTION OF THE DRAWINGS.

FIG. 12 gives an alternative aerostabilizer to that presented in FIG. 11. In this case, a second aerostabilizer 39 has been added. It moves with the first aerostabilizer 30 since they are connected by aerostabilizer connecting bracket 50.

FIG. 13 presents another alternative for the aerostabilizer arrangements. In this instance, the first aerostabilizer 30 moves and functions as does that in FIG. 11; however, the second aerostabilizer 39 operates independently to the first aerostabilizer 30. The second aerostabilizer 39 may have a connection to the first aerostabilizer 30, may be fixed, or otherwise. It is also to be noted any number of aerostabilizers may be used and would still be considered a part of the intent of the instant invention.

While the invention has been described in connection with a preferred and several alternative embodiments, it will be understood that there is no intention to thereby limit the invention. On the contrary, there is intended to be covered all alternatives, modifications, and equivalents as may be include within the spirit and scope of the invention as defined by the appended claims, which are the sole definition of the invention.

What we claim is:

1. In an improved first aerostabilizer for vehicles that is capable of changing to a more vertical position when the vehicle is decelerated to thereby add an aerodynamic braking force that aids in stopping the vehicle, the improvement comprising:
   a weight in communication with the first aerostabilizer wherein said weight is free to move at a different rate than the first aerostabilizer when the vehicle is decelerated, such movement of said weight, by means of its communication with the first aerostabilizer, places a biasing force on said first aerostabilizer thereby allowing said first aerostabilizer to rotate about a pivot resulting in a raising of one end of the first aerostabilizer higher than another end of said first aerostabilizer.

2. The improved first aerostabilizer of claim 1 which further comprises a second aerostabilizer in communication with the first aerostabilizer and wherein said second aerostabilizer moves with the first aerostabilizer.

3. The improved first aerostabilizer of claim 1 which further comprises a second aerostabilizer that is, at least partially, independent of movement of the first aerostabilizer.

4. The improved first aerostabilizer of claim 1 wherein the pivot is disposed proximal an average fore to aft mid-point of the first aerostabilizer.

5. The improved first aerostabilizer of claim 1 wherein the pivot is disposed within fifteen percent of a midpoint of an average fore to aft length of the first aerostabilizer.

6. The improved first aerostabilizer of claim 1 wherein the pivot is disposed within thirty percent of a midpoint of an average fore to aft length of the first aerostabilizer.

7. The improved first aerostabilizer of claim 1 wherein the pivot is disposed within forty-five percent of a midpoint of an average fore to aft length of the first aerostabilizer.

8. The improved first aerostabilizer of claim 2 wherein the pivot is disposed approximate an average of an algebraic sum of fore to aft lengths and spacings of the first and second aerostabilizers.

9. The improved first aerostabilizer of claim 2 wherein the pivot is disposed within fifteen percent of a midpoint of an algebraic sum of fore to aft lengths and spacings of the first and second aerostabilizers.

10. The improved first aerostabilizer of claim 2 wherein the pivot is disposed within thirty percent of a midpoint of an algebraic sum of fore to aft lengths and spacings of the first and second aerostabilizers.

11. The improved first aerostabilizer of claim 2 wherein the pivot is disposed within forty-five percent of a midpoint of an algebraic sum of the fore to aft lengths and spacings of the first and second aerostabilizers.

12. The improved first aerostabilizer of claim 1 which further comprises one or more additional aerostabilizers in communication with and move when the first aerostabilizer moves.

13. The improved first aerostabilizer of claim 12 wherein the pivot is disposed within fifteen percent of a midpoint of an algebraic sum of the fore to aft lengths and spacings of the aerostabilizers.

14. The improved first aerostabilizer of claim 12 wherein the pivot is disposed within thirty percent of a midpoint of an algebraic sum of the fore to aft lengths and spacings of the aerostabilizers.

15. The improved first aerostabilizer of claim 12 wherein the pivot is disposed within forty-five percent of a midpoint of an algebraic sum of the fore to aft lengths and spacings of the aerostabilizers.

16. The improved first aerostabilizer of claim 1 wherein communication means of said weight with the first aerostabilizer includes a first connecting lever.

17. The improved first aerostabilizer of claim 1 wherein communication means of said weight with the first aerostabilizer includes a second connecting lever.

18. The improved first aerostabilizer of claim 16 wherein communication means of said weight with the first aerostabilizer includes a first gear.

19. The improved first aerostabilizer of claim 16 wherein communication means of said weight with the first aerostabilizer includes a second gear.

20. The improved first aerostabilizer of claim 1 which further includes a resiliently biasing means to dampen movement of the weight.

21. The improved first aerostabilizer of claim 20 wherein the resiliently biasing means is, at least in part, a spring.

22. The improved first aerostabilizer of claim 20 wherein the resiliently biasing means is, at least in part, a dashpot.

23. The improved first aerostabilizer of claim 1 wherein said weight is disposed, at least partially, internal to a first stanchion and wherein said first stanchion is disposed between the first aerostabilizer and an attachment means on the vehicle.

24. The improved first aerostabilizer of claim 23 which further includes a second stanchion with said first and said second stanchion in communication by a connecting structure where said connecting structure is disposed, at least primarily, below the first aerostabilizer and above the attachment means on the vehicle.

25. The improved first aerostabilizer of claim 21 wherein a vehicle stoplight is mounted to said connecting structure.

26. In an improved first aerostabilizer for vehicles that is capable of changing to a more vertical position when the vehicle is decelerated to thereby add an aerodynamic braking force that aids in stopping the vehicle, the improvement comprising:
a weight in communication with the first aerostabilizer wherein said weight, when the vehicle is decelerated, applies a force to the first aerostabilizer that causes said first aerostabilizer to rotate to a more vertical orientation.

27. The first aerostabilizer of claim 26 wherein said first aerostabilizer rotates around a pivot.

28. The improved first aerostabilizer of claim 26 which further comprises a second aerostabilizer in communication with the first aerostabilizer and wherein said second aerostabilizer moves with the first aerostabilizer.

29. The improved first aerostabilizer of claim 26 which further comprises a second aerostabilizer that is, at least partially, independent of movement of the first aerostabilizer.

30. The improved first aerostabilizer of claim 27 wherein the pivot is disposed proximal an average fore to aft midpoint of the first aerostabilizer.

31. The improved first aerostabilizer of claim 27 wherein the pivot is disposed within fifteen percent of a midpoint of an average fore to aft length of the first aerostabilizer.

32. The improved first aerostabilizer of claim 27 wherein the pivot is disposed within thirty percent of a midpoint of an average fore to aft length of the first aerostabilizer.

33. The improved first aerostabilizer of claim 27 wherein the pivot is disposed within forty-five percent of a midpoint of an average fore to aft length of the first aerostabilizer.

34. The improved first aerostabilizer of claim 28 wherein a pivot is disposed approximate an average of an algebraic sum of fore to aft lengths and spacings of the first and second aerostabilizers.

35. The improved first aerostabilizer of claim 28 wherein a pivot is disposed within fifteen percent of a midpoint of an algebraic sum of fore to aft lengths and spacings of the first and second aerostabilizers.

36. The improved first aerostabilizer of claim 28 wherein a pivot is disposed within thirty percent of a midpoint of an algebraic sum of fore to aft lengths and spacings of the first and second aerostabilizers.

37. The improved first aerostabilizer of claim 28 wherein a pivot is disposed within forty-five percent of a midpoint of an algebraic sum of the fore to aft lengths and spacings of the first and second aerostabilizers.

38. The improved first aerostabilizer of claim 26 which further comprises one or more additional aerostabilizers in communication with and move when the first aerostabilizer moves.

39. The improved first aerostabilizer of claim 38 wherein a pivot is disposed within fifteen percent of a midpoint of an algebraic sum of the fore to aft lengths and spacings of the aerostabilizers.

40. The improved first aerostabilizer of claim 38 wherein a pivot is disposed within thirty percent of a midpoint of an algebraic sum of the fore to aft lengths and spacings of the aerostabilizers.

41. The improved first aerostabilizer of claim 38 wherein a pivot is disposed within forty-five percent of a midpoint of an algebraic sum of the fore to aft lengths and spacings of the aerostabilizers.

42. The improved first aerostabilizer of claim 26 wherein communication means of said weight with the first aerostabilizer includes a first connecting lever.

43. The improved first aerostabilizer of claim 26 wherein communication means of said weight with the first aerostabilizer includes a second connecting lever.

44. The improved first aerostabilizer of claim 26 wherein communication means of said weight with the first aerostabilizer includes a first gear.

45. The improved first aerostabilizer of claim 26 wherein communication means of said weight with the first aerostabilizer includes a second gear.

46. The improved first aerostabilizer of claim 26 wherein said weight is disposed, at least partially, internal to a stanchion and wherein said stanchion is disposed between the first aerostabilizer and an attachment means on the vehicle.

47. The improved first aerostabilizer of claim 46 which further includes a second stanchion with said first and said second stanchion in communication by a connecting structure where said connecting structure is disposed, at least primarily, below the first aerostabilizer and above the attachment means on the vehicle.

48. The improved first aerostabilizer of claim 47 wherein a vehicle stoplight is mounted to said connecting structure.

49. In an improved first aerostabilizer for vehicles that is capable of changing to a more vertical position when the vehicle is decelerated to thereby add an aerodynamic braking force that aids in stopping the vehicle, the improvement comprising:
a weight in communication with the first aerostabilizer wherein said weight, when the vehicle is decelerated, applies a force to the first aerostabilizer that causes said first aerostabilizer to rotate to a more vertical orientation and wherein a pivot about which the first aerostabilizer rotates is disposed to aid in providing a balancing of aerodynamic and weight forces about said pivot when the vehicle decelerates.

50. The improved first aerostabilizer of claim 49 which further comprises a second aerostabilizer in communication with the first aerostabilizer and wherein said second aerostabilizer moves with the first aerostabilizer.

51. The improved first aerostabilizer of claim 49 which further comprises a second aerostabilizer that is, at least partially, independent of movement of the first aerostabilizer.

52. The improved first aerostabilizer of claim 49 wherein the pivot is disposed proximal an average fore to aft midpoint of the first aerostabilizer.

53. The improved first aerostabilizer of claim 49 which further comprises one or more additional aerostabilizers in communication with and move when the first aerostabilizer moves.

* * * * *